United States Patent
Yi Dar Lo (10) Patent No.: US 7,525,921 B1
(45) Date of Patent: Apr. 28, 2009

(54) DISCARD INTERFACE FOR DIFFUSING NETWORK ATTACKS

(75) Inventor: Jeffrey Yi Dar Lo, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1031 days.

(21) Appl. No.: 10/454,271

(22) Filed: Jun. 4, 2003

(51) Int. Cl.
*G01R 31/08* (2006.01)

(52) U.S. Cl. .......................... 370/241; 370/422; 726/22

(58) Field of Classification Search .................. 370/351, 370/341, 241, 389, 422; 726/22
See application file for complete search history.

(56) References Cited

U.S. PATENT DOCUMENTS 6,704,874 B1 * 3/2004 Porras et al. .................. 726/22

2004/0250124 A1 * 12/2004 Chesla et al. ............... 713/201
2005/0007952 A1 * 1/2005 Scott ........................... 370/229

* cited by examiner

*Primary Examiner*—Kevin C Harper
*Assistant Examiner*—Wanda Z Russell
(74) *Attorney, Agent, or Firm*—Shumaker & Sieffert, P.A (57) ABSTRACT

A router detects a network attack and forwards traffic associated with the network attack to a discard interface. The router applies one or more filters to calculate traffic flow statistics for the traffic forwarded to the discard interface. The router may exchange routing communications with one or more other routers to alert the routers of the network attack. For example, the router may generate a routing communication in accordance with a routing protocol that advertises a route to the targeted device, and includes a policy tag that indicates the existence of a network attack. The other routers update forwarding information in accordance with the advertised route, and automatically forward traffic to respective discard interfaces based on the policy tag, thereby diffusing the network attack.

39 Claims, 4 Drawing Sheets

DISCARD INTERFACE FOR DIFFUSING NETWORK ATTACKS

TECHNICAL FIELD

The invention relates to computer networks and, more particularly, to diffusing network attacks within computer networks.

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

The Internet and other computer networks are prone to network attacks. One type of network attack that represents a threat to enterprises operating over the Internet is the Denial-of-Service (DoS) attack. A notable form of a DoS attack is the direction of an abundance of traffic to a targeted computing device by one or more malicious parties in an attempt to sabotage network operation of the targeted computing device. The attack traffic may be generated from a single source or simultaneously from multiple points on the network from machines that have been "hijacked" or subverted by the attacker. This form of a DoS attack is often referred to as a distributed DoS (DDoS) attack.

This abundance of traffic can cause one or more network services provided by the targeted computing device to be unavailable. In other words, the abundance of incoming traffic occupies computing resources of the targeted device, rendering the resources unavailable for legitimate traffic. In extreme cases, the targeted computing device may temporarily lose network connectivity and services.

SUMMARY

In general, the invention is directed to techniques for diffusing network attacks, such as a Denial-of-Service (DoS) attack or a distributed DoS attack. More specifically, upon detecting a network attack, a router forwards malicious traffic of the network attack to an interface preconfigured to discard traffic, referred to herein as a "discard interface." The router may detect the network attack using a network attack detection algorithm or from a routing communication received from a neighboring network device. For example, the router may detect a network attack based upon the amount of received traffic having the same destination address in comparison with a defined threshold. In response, the router may automatically update forwarding information in order to route traffic associated with the network attack to the discard interface. For example, the router may update a next hop associated with a targeted computing device to a next hop associated with the discard interface. In this manner, traffic destined for the targeted computing device is discarded, thereby diffusing the network attack.

In accordance with the invention, the usage of a dedicated discard interface allows existing filtering and accounting hardware within the forwarding path of the router to be easily used for calculating flow statistics for traffic routed to the discard interface. For example, the router may associate a filter with the discard interface, and apply filtering rules to the traffic routed to the discard interface. The filter may include one or more counters to calculate the traffic flow statistics for the traffic routed to the discard interface. The traffic flow statistics calculated by the router may include, for example, the number of packets routed to the discard interface, the number of bytes routed to the discard interface, and a log of traffic routed to the discard interface. As a result, a network operator can analyze the traffic flow statistics calculated by the router as an aid in identifying the source of the network attack, e.g., one or more malicious host devices or at a gateway router used by the malicious source. In addition, the filter associated with the discard interface may be used to sample traffic.

The router may exchange routing communications with neighboring network devices, such as neighboring routers, to alert the neighboring routers of the network attack. More specifically, the router generates a routing communication that indicates the existence of the network attack, and forwards the routing communication to neighboring network devices. The routing communication may include an identifier that indicates the existence of the network attack. The identifier may, for example, be a standard routing policy tag that is appended to the header of a packet. The routing communication may include a second identifier that indicates the identity of the targeted computing device. For example, the routing communication may include an IP address or a prefix of an IP address of the targeted computing device. Other network routers receiving the communication may extract the IP address of the targeted computing device and update respective sets of forwarding information in order to discard traffic associated with the network attack and destined to the targeted computing device. In this manner, the routing communication identifying the network attack is exchanged between routers throughout a public network resulting in discarding of network attack traffic near the source of the network attack.

In one embodiment, a method comprises detecting a network attack, forwarding packets associated with the network attack to a discard interface of a network device in response to the network attack, and discarding the packets with the discard interface.

In another embodiment, a method comprises receiving a network communication that includes routing information specifying at least one route to a destination within a network in accordance with a routing protocol, and processing the network communication to determine whether the routing information includes a network attack indicator associated with the route. The method further comprises routing network traffic to the destination in accordance with the routing information when the network attack indicator is not present within the routing information, and routing network traffic to a discard interface when the network attack indicator is present within the routing information.

In another embodiment, a network device comprises a set of interfaces to send and receive packets from a network, and a discard interface configured to discard at least a portion of the packets. The network device further comprises a control unit to forward the packets between the interfaces in accordance with forwarding information, wherein the control unit updates the forwarding information to forward the portion of the packets to the discard interface.

In another embodiment, a computer-readable medium comprises instructions to cause a processor to present an interface to receive input from a user that specifies a forwarding policy a policy tag indicative of a network attack, and receive routing information from a router via a routing protocol, wherein the routing information specifies a network route and the policy tag. The instructions further cause the processor to forward packets associated with the network route to a discard interface to be dropped.

The invention may provide one or more advantages. For example, a router may calculate traffic flow statistics for discarded traffic associated with the network attack, which allows a network operator to more quickly identify the source or sources of the network attack. Further, the router may forward routing communications to neighboring routers throughout the network to alert the neighboring routers of the network attack. Forwarding the routing communications to neighboring routers may allow the routers to discard traffic associated with the network attack close to the source of a network attack.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
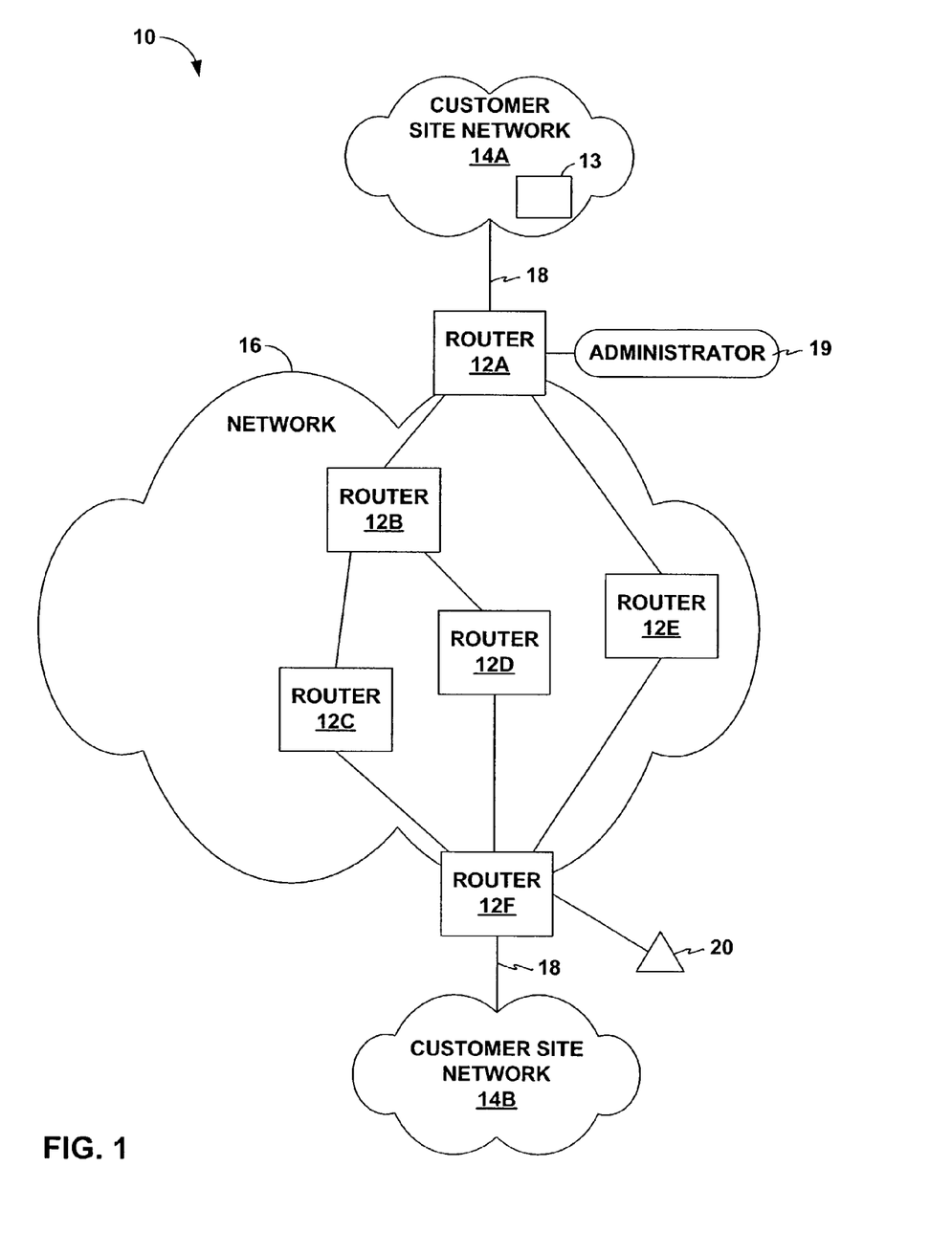
FIG. 1 is a block diagram illustrating a computer network in which a router utilizes a discard interface in accordance with the principles of the invention.

FIG. 1 is a block diagram illustrating an exemplary system 10 in which routers 12A-12F ("routers 12") diffuse a network attack, such as Denial-of-Service (DoS) attack, in accordance with the principles of the invention. As will be described, routers 12 forward malicious traffic of the network attack to interfaces, referred to herein as "discard interfaces," for automatic filtering and accounting.

In the illustrated embodiment, routers 12 couple customer site networks 14A-14B ("customer site networks 14") to a public network 16. Public network 16 includes one or more autonomous systems (not shown) having a number of devices, such as routers 12, switches (not shown), hubs, gateways, and the like, to forward traffic. Customer site networks 14 may be geographically distributed sites of multiple customers. Each of customer site networks 14 include one or more computing devices (not shown), such as personal computers, laptop computers, handheld computers, workstations, servers, routers, switches, printers, fax machines, or the like. Customer site networks 14 may comprise one or more Local Area Networks (LANs), Wide Area Network (WANs), or the like. Although system 10 may include any number of customer site networks 14 coupled to public network 16 by any number of routers 12, FIG. 1, for simplicity, shows only customer site networks 14A and 14B coupled to public network 16 by routers 12A and 12F, respectively. Each of customer site networks 14 connects to respective routers 12 via one or more access links 18.

In accordance with the principles of the invention, a router, e.g., router 12A, identifies a targeted host 13 as subject to a network attack. In response, router 12A automatically updates forwarding information associated with targeted host 13 to route traffic associated with the network attack to the discard interface. For example, router 12A may update a next hop associated with a targeted computing device to a next hop associated with the discard interface. In this manner, router 12A automatically discards traffic destined for the targeted host 13, thereby diffusing the network attack. In addition, router 12A may utilize internal filtering and accounting functionality, e.g., hardware and/or software, already present within its forwarding path to calculate flow statistics for traffic routed to the discard interface. The filtering functionality may also provide the capability to sample traffic for online or later offline analysis.

The traffic flow statistics calculated by routers 12 may include, for example, the number of packets routed to the discard interface, the number of bytes routed to the discard interface, and a log of traffic routed to the discard interface. The traffic flow statistics may aid a client, such as network administrator 19, in identifying the source of the network attack, e.g., one or more malicious host devices or to a gateway router used by the malicious source.

In the example of FIG. 1, a malicious host 20 sends an abundance of traffic to a destination address associated with targeted host 13 to cause one or more network services provided by targeted host 13 to be unavailable. In other words, the abundance of traffic from malicious host 20 occupies computing resources of targeted host 13, making the resources unavailable to provide services to legitimate traffic. In this manner, malicious host 20 generates a network attack and, more specifically, a DoS attack. Targeted host 13 may, for example, comprise a mail server, a web server, a router, or other network device that provides one or more network services. In the case in which targeted host 13 comprises a mail server, the abundance of traffic from malicious host 20 may cause the computing resources of targeted host 13 to become unavailable to provide electronic mail (e-mail) services to legitimate client devices. In this manner, targeted host 13 appears to have temporarily lost network connectivity and services.

Router 12A detects the DoS attack generated by the abundance of traffic sent to targeted host 13 from malicious host 20. Router 12A may, for example, detect the DoS attack when the amount of received traffic destined for targeted host 13 exceeds a threshold amount. Upon detecting the DoS attack, router 12A identifies the device targeted by the DoS attack, i.e., targeted host 13, and forwards traffic destined for targeted host 13 to a discard interface. Router 12A may, for example, automatically update internal forwarding information to map a next hop associated with targeted host 13 to the discard interface. In this manner, router 12A thwarts the DoS attack by automatically discarding the malicious traffic from malicious host 20. As described above, router 12A may further calculate traffic flow statistics for the traffic routed to the discard interface as well as sample traffic routed to the discard interface.

In one embodiment, router 12A exchanges routing communications to alert other routes 12 of the DoS attack. For example, upon detecting the DoS attack, router 12A generates a routing communication that specifies targeted host 13 as a target of the DoS attack. The routing communication may, for instance, include an Internet Protocol (IP) address or prefix associated with targeted host 13, as well as an identifier to indicate to other routers 12 that the address or prefix is the target of a network attack. As another example, router 12A may include additional flow information, such as protocol, source and destination ports, source and destination IP addresses, and the like.

Router 12A forwards the routing communication to routers 12B and 12E to alert the routers of the DoS attack on targeted host 13. Upon receiving the communication, routers 12B and 12E begin to route traffic destined for targeted host 13 to respective discard interfaces. In turn, router 12B forwards a routing communication to routers 12C and 12D to alert the routers of the DoS attack on targeted host 13. Routers 12C, 12D and 12E forward a routing communication to router 12F to alert router 12F of the DoS attack on targeted host 13. In this manner, the routing communication describing the DoS attack is propagated throughout public network 16, resulting in discarding of network attack traffic near the source of the network attack, e.g, via router 12F. Consequently, bandwidth impact on network 16 as a result of the attack may be minimized.

Although the example illustrated in FIG. 1 is described in terms of diffusing a DoS attack, the techniques of the invention may be used in response to other types of network attacks, such as distributed DoS attacks. In the case of distributed DoS attacks, routers 12 exchange routing information such that the routers near each of the malicious network devices discard the distributed DoS attack traffic.

Figure 2:
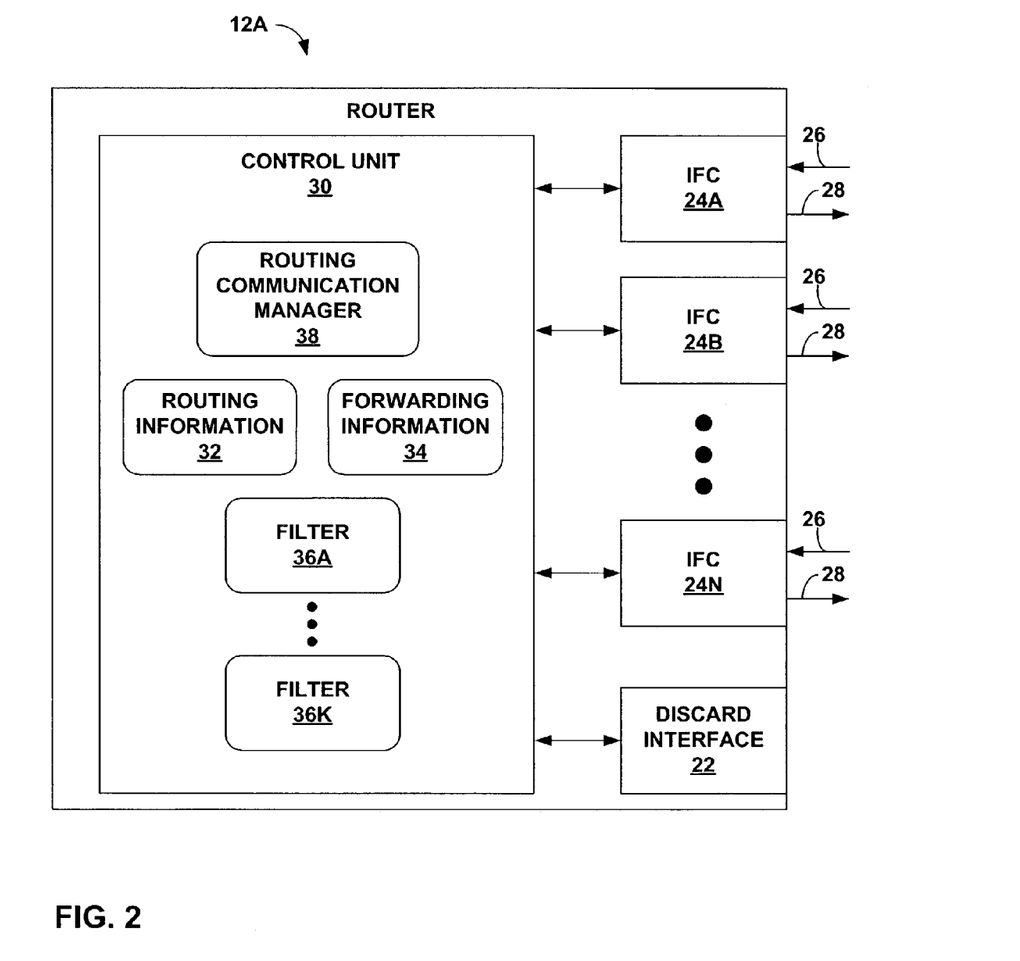
FIG. 2 is a block diagram illustrating an exemplary router that diffuses a network attack and calculates traffic flow statistics in accordance with the invention.

FIG. 2 is a block diagram illustrating an example embodiment of a router, e.g., router 12A, that utilizes a discard interface for filtering and accounting network attack traffic in accordance with the invention. In the illustrated embodiment, router 12A includes interface cards 24A-24N ("IFCs 24") that receive and send data flows via network links 26 and 28, respectively. IFCs 24 are typically coupled to network links 26 and 28 via a number of interface ports (not shown). IFCs 24 communicate with a control unit 30 via one or more physical and/or logical interfaces.

Control unit 30 maintains routing information 32 that describes the topology of network 16. In particular, routing information 32 describes various routes within network 16, and the appropriate next hops for each route, i.e., the neighboring devices of router 12A along each of the routes. Control unit 30 analyzes routing information 32, and performs route resolution to generate forwarding information 34. Forwarding information 34 maps network destinations to specific next hops and corresponding interfaces, which may be physical or logical interfaces. In general, the physical or logical interfaces corresponding to the next hops are associated with one of IFCs 24. Control unit 30 may store routing information 32 and forwarding information 34 as one or more tables, link lists, radix trees, databases, flat files, or various other data structures.

In general, router 12A receives inbound packets from network links 26, determines destinations for the received packets, and outputs the packets on network links 28 based on the destinations. More specifically, upon receiving an inbound packet via one of inbound links 26, a respective one of IFCs 24 relays the packet to control unit 30. In response, control unit 30 reads a block of data from the packet, referred to as the "key," that includes a network destination for the packet. The key may, for example, contain a routing prefix for another router within the network. Based on the destination, control unit 30 forwards the packet to one of the interfaces for transmission on network links 28 via an associated one of IFCs 24.

In addition to the interfaces associated with IFCs 24, router 12A maintains discard interface 22 for filtering and accounting network attack traffic. In particular, discard interface 22 may be a physical or logical interface, and may be associated with one or more next hops in a manner similar to the interfaces associated with IFCs 24. As a result, discard interface 22 may be utilized in a manner consistent with the other interfaces maintained by router 12A. For example, filtering and accounting functions within a forwarding path of control unit 12A can be used for calculating flow statistics for traffic routed to discard interface 22. As a result, control unit 30 may easily associate one or more filters with discard interface 22, and apply filtering rules to the traffic routed to the discard interface. In this manner, control unit 30 can discard traffic associated with a network attack, such as a DoS attack, via discard interface 22, and calculate traffic flow statistics for the traffic discarded via discard interface 22. Additionally, the filters associated with the discard interface may sample traffic, which may be forwarded to an independent traffic collection device or a traffic collection device within router 12A. The traffic collection device stores the sampled traffic for online or future offline analysis.

In operation, router 12A detects a network attack and the target device of the network attack, i.e., targeted host 13. Router 12A may detect the network attack using a network attack detection algorithm. Router 12A may, for example, detect a DoS attack when the amount of received traffic for a particular destination exceeds a threshold value. Alternatively, router 12A may detect the network attack based on a routing communication received from a neighboring network device. More specifically, a routing communication manager 38 executing within control unit 30 may receive the routing communication, and extract an attack indicator that indicates the existence of the network attack. As described, the routing communication may further include an IP address or a prefix of an IP address associated with targeted host 13. Upon extracting the attack indicator from the routing communication, routing communication manager 38 notifies control unit 30 to reroute traffic destined for targeted host 13 to discard interface 22.

In response, control unit 30 automatically updates forwarding information 34 to forward traffic associated with the DoS attack to discard interface 22. Specifically, control unit 30 updates the advertised next hop corresponding to the IP address or prefix of the IP address of targeted host 13, and associates that next hop with discard interface 22. In other words, control unit 30 updates forwarding information 34 to map the next hop associated with the targeted host 13 from an interface associated with IFCs 24 to discard interface 22. In this manner, network traffic received from IFCs 24 and destined for targeted host 13 may be automatically forwarded to discard interface 22 in normal fashion.

Control unit 30 may further include filters 36A-36K ("filters 36") for filtering inbound and outbound traffic. For example, router 12A may compare information within an inbound packet to a set of filtering rules defined by filters 36. The filtering rules may specify a packet flow, such as a particular source IP address, destination IP addresses, source port number, destination port number, protocol, or other criteria. Moreover, each of filters 36 may define one or more associated actions to be applied to packets that satisfy the filtering rules. The action may include dropping the packet, remarking the packet as lower priority, counting packets that match the filtering rule, sampling packets and the like. Router 12A may associate one or more of filters 36 with respective physical or logical interfaces, e.g., discard interface 22.

As a result, router 12A may utilize filters 36 calculate traffic flow statistics for the traffic of the network attack as well as sample the network attack traffic. In other words, router 12A may associate a filter with full functionality with discard interface 22. For example, router 12A may utilize one or more of filters 36 to count the number of packets routed to discard interface 22, count the number of bytes routed to discard interface 22, or log traffic routed to discard interface 22. A network operator may utilize the traffic flow statistics as an aid in identifying the source of the network attack, e.g., one or more malicious host devices or at a gateway router used by the malicious source.

Router 12A and, more particularly, routing communication manager 38 may also generate an outbound routing communication that includes an attack indicator that indicates the existence of a network attack and specifies a targeted device. Router 12A forwards the routing communication to other network routers to alert the network routers of the network attack targeting targeted host 13. This way, the neighboring routers may begin to discard network attack traffic.

Control unit 30 may operate according to executable instructions fetched from a computer-readable medium. Examples of such media include random access memory (RAM), read-only memory (ROM), non-volatile random access memory (NVRAM), electrically erasable programmable read-only memory (EEPROM), flash memory, and the like. The functions of router 12A may be implemented by executing the instructions of the computer-readable medium with one or more processors, discrete hardware circuitry, firmware, software executing on a programmable processor, or a combination of any of the above.

Figure 3:
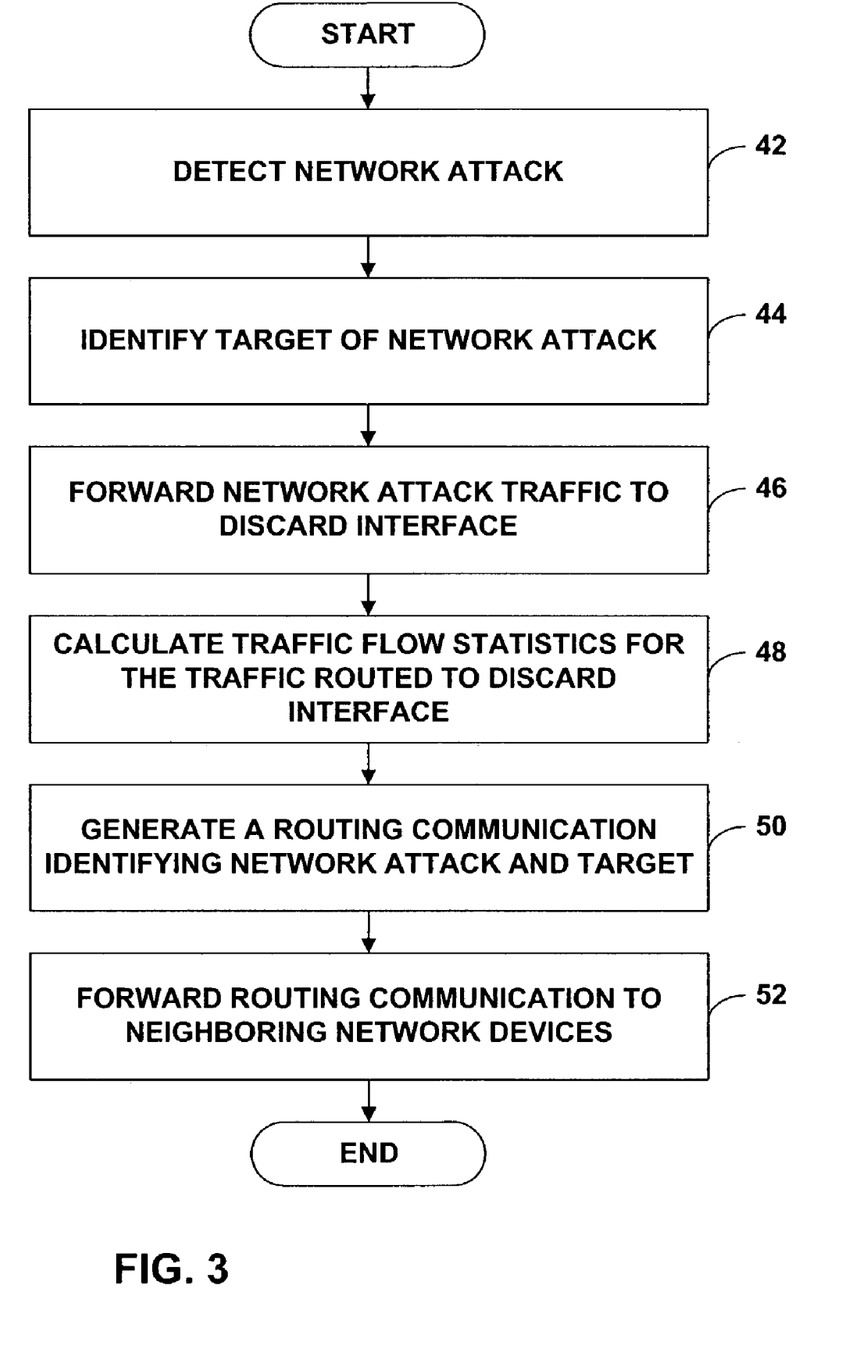
FIG. 3 is a flow diagram illustrating exemplary operation of a router diffusing a network attack in accordance with the invention.

FIG. 3 is a flow diagram illustrating exemplary operation of a router diffusing a network attack in accordance with the invention. Initially, a router, such as router 12A of FIG. 2, detects a network attack (42). Router 12A may detect the network attack using a network attack detection algorithm. For example, as described above, router 12A near the target of the network attack may detect a network attack when an amount of received traffic having the same destination address exceeds a threshold value. In other embodiments, router 12A receives a routing communication from another router that indicates the presence of the network attack.

Router 12A identifies a computing device targeted by the network attack, e.g., targeted host 13 of FIG. 1 (44). For example, the routing communication received from neighboring routers may include an identifier associated with the targeted computing device. The identifier associated with the targeted computing device may comprise, for example, an IP address of the targeted computing device, a prefix, or packet flow information, such as source address, destination address, source port, destination port, protocol, and the like. In some cases, more than one computing device may be targeted by the network attack.

Router 12A automatically forwards traffic associated with the network attack to discard interface 22 (46). Router 12A may, for example, automatically update forwarding information 34 in order to route the traffic destined for the targeted computing device to discard interface 22. In other words, router 12A may update the forwarding information 34 to map the next hop associated with the targeted computing device to discard interface 22. In this manner, traffic associated with the network attack is automatically forwarded to discard interface 22 to be discarded, thereby diffusing the network attack. A user, such as a system administrator, may preconfigure characteristics of discard interface 22 and associated filters 36 via a user interface, such as a command line interface (CLI).

In accordance with the principles of the invention, router 12A may calculate traffic flow statistics for the traffic routed to discard interface 22 (48). For example, router 12A may associate one or more filters 36 with discard interface 22 for application to traffic forwarding to the discard interface. The associated ones of filters 36 may be used to calculate traffic flow statistics, such as the number of packets routed to discard interface 22 or the number of bytes routed to discard interface 22, or to log traffic routed to discard interface 22. In addition, filters 36 associated with discard interface 22 may further be used to sample traffic.

Additionally, router 12A may generate a routing communication that indicates the existence of the network attack (50), and forward the routing communication to other network devices to alert the neighboring network devices of the network attack (52). The routing a communication includes an attack indicator that indicates the existence of the network attack. The attack indicator may, for example, comprise a routing policy tag that is appended to the header of a packet. The routing communication further includes an identifier that indicates the identity of the targeted computing device. For example, the routing communication may include an IP address or a prefix of an IP address of the targeted computing device, or packet flow information. Upon receiving a routing communication with an attack indicator, other network routers extract the identifier and update respective forwarding information to automatically discard traffic associated with the network attack. In this manner, communications may propagate across network 16 until one or more routers close to malicious host 20, e.g., router 12F, discard the traffic, thereby reducing any impact of the attack on network 16.

Figure 4:
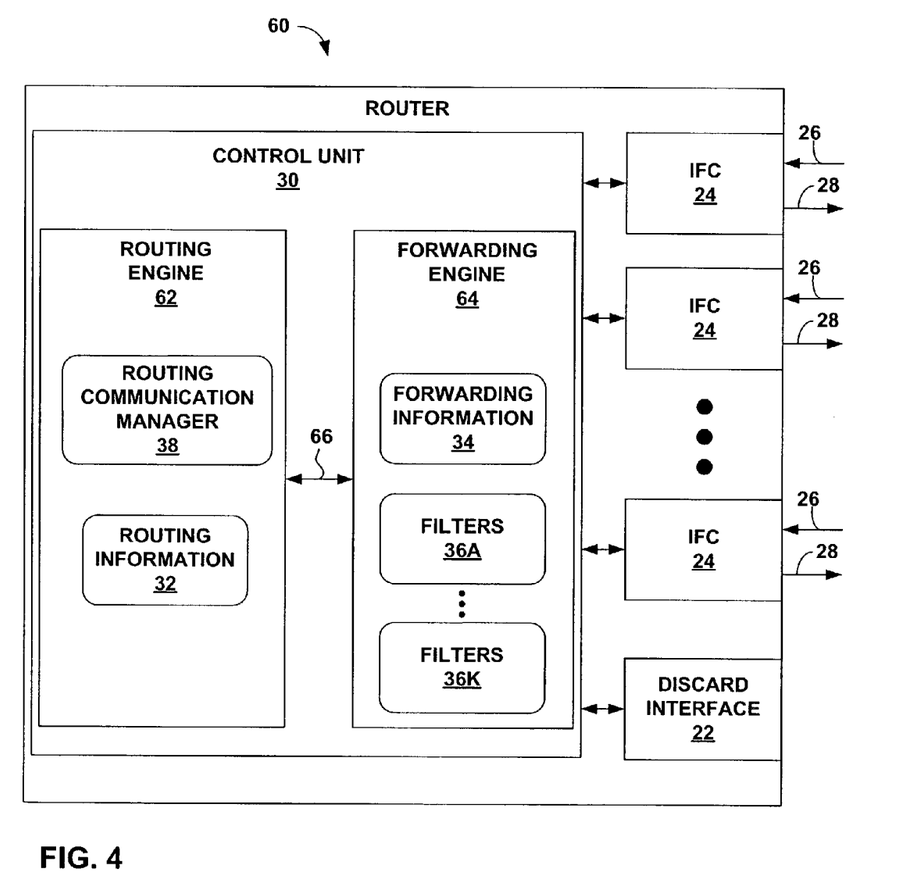
FIG. 4 is a block diagram illustrating another exemplary router that diffuses network attacks in accordance with the principles of the invention.

FIG. 4 is a block diagram illustrating another exemplary router 60 that automatically forwards traffic associated with a network attack to a discard interface 22. Router 60 includes interface cards 24A-24N ("IFCs 24") that receive and send packet flows via network links 26 and 28, respectively. In addition, router 60 includes discard interface 22 that discards traffic routed to it from control unit 30.

In the illustrated embodiment, control unit 30 comprises a routing engine 62 and at least one forwarding engine 64. Routing engine 62 is primarily responsible for maintaining routing information 32, which describes the topology of a network. In particular, routing information 32 describes various routes within the network, and the next hops associated with each route, i.e., the neighboring devices of router 60 along each of the routes. Routing engine 62 periodically updates routing information 32 to reflect the network topology.

Routing engine 62 analyzes routing information 32 and generates forwarding information 34 for forwarding engine 64. Forwarding information may associate, for example, network destinations with specific next hops and corresponding physical or logical interfaces. Forwarding engine 64 may further include filters 36A-36K ("filters 36") that calculate traffic flow statistics for traffic routed by router 60.

As described in detail above, control unit 30 detects a network attack, causing routing engine 62 to update forwarding information 34 to automatically forward traffic associated with the network attack to discard interface 22. Routing engine 62 may further direct forwarding engine 64 to associate one of more of filters 36 with discard interface 22, e.g., for the calculation of traffic flow statistics. Routing communication manager 38 exchanges routing communication information with neighboring routers to alert the other routers of the network attack.

In one embodiment, each of routing engine 62 and forwarding engine 64 may comprise one or more dedicated processors, hardware, and the like, and may be communicatively coupled by a data communication channel 66. Data communication channel 66 may be a high-speed network connection, bus, shared-memory or other data communication mechanism. Routing engine 62, forwarding engine 64, or both, may make use of the data structures described above for storing routing information 32 and forwarding information 34, respectively.

In other embodiments, the functionality of routing engine 62, forwarding engine 64, or both, may be distributed within one or more of IFCs 24. In other words, IFCs 24 may include hardware and or software for implementing all or portions of the routing and forwarding functions described above. In such an embodiment, IFCs 24 may forward packets under the direction of a centralized routing engine 62, and may automatically forward packets to discard interface 22 in the event of a network attack.

Various embodiments of the invention have been described. Although the embodiments have been described in terms of packet-based systems and methods, any data units may be used without departing from the principles of the invention. For example, the principles of the invention may be readily applied to a variety of protocols, such as the Transmission Control Protocol (TCP), the User Datagram Protocol (UDP), the Internet Protocol (IP), Asynchronous Transfer Mode (ATM), Frame Relay, and the like. Accordingly, "packet" is used to encompass any such unit of data, and may be interchanged with the term "cell," or other similar terms used in such protocols to describe a unit of data communicated between resources within the network. These and other embodiments are within the scope of the following claims.

The invention claimed is:

1. A method comprising:
   storing, within a network router, routing information specifying a plurality of routes to network destinations within a network;
   storing, within the network router, forwarding information that maps the network destinations to next hops that represent neighboring devices within the network and to corresponding output interfaces of the network router for reaching the neighboring devices;
   configuring the output interfaces to include a discard interface;
   detecting, with the network router, a network attack;
   identifying a target of the network attack;
   updating the forwarding information of the network router in response to the network attack to direct packets associated with the network attack to the discard interface by setting the next hop associated with a route to the target in the forwarding information to a next hop associated with the discard interface;
   forwarding the packets associated with the network attack to the discard interface in response to the network attack;
   forwarding packets that are not associated with the network attack to the respective next hops according to the forwarding information through the corresponding output interfaces instead of the discard interface; and
   discarding the packets received by the discard interface.

2. The method of claim 1 further comprising calculating traffic flow statistics for the packets forwarded to the discard interface.

3. The method of claim 2 wherein calculating traffic flow statistics comprises calculating one of a number of packets forwarded to the discard interface and a number of bytes forwarded to the discard interface.

4. The method of claim 2 wherein calculating traffic flow statistics comprises generating a log of the packets routed to the discard interface.

5. The method of claim 2 wherein calculating traffic flow statistics comprises applying a filter associated with the interface.

6. The method of claim 5, further comprising:
   receiving input from a user prior to the network attack, wherein the input defines at least one action; and
   configuring the filter prior to the network attack to perform the action specified by the input in response to the network attack; and
   associating the filter with the interface.

7. The method of claim 1, further comprising:
   generating a communication that advertises a route associated with a network destination that is targeted by the attack, wherein the communication includes an attack identifier that indicates the existence of the network attack; and
   forwarding the communication to other network devices in accordance with a routing protocol.

8. The method of claim 7, wherein the communication specifies a network prefix associated with the network destination.

9. The method of claim 7 wherein the generating a communication comprises generating a communication to advertise the route in accordance with the routing protocol and include a policy tag to indicate that the advertised route is associated with a network attack.

10. The method of claim 1, wherein detecting a network attack comprises detecting the network attack via a network attack detection algorithm.

11. The method of claim 1, wherein detecting a network attack comprises receiving a communication in accordance with a routing protocol from another network device that indicates the existence of the network attack.

12. The method of claim 1, wherein the network attack comprises one of a denial of service attack and a distributed denial of service attack.

13. The method of claim 1, wherein forwarding packets to a discard interface comprises forwarding packets to a discard interface that is a physical or logical output interface of the network router.

14. A method comprising:
   receiving with a first router a network routing communication from a second router, the network communication conforming to a routing protocol and including routing information specifying at least one route to a destination within a network;
   processing the network routing communication with the first router to determine whether the routing information includes a network attack indicator associated with the route;
   generating, with the first router, forwarding information in accordance with the routing information, the forwarding information mapping a plurality of network destinations to a plurality of interface so the first router, the first router generating the forwarding information to include a discard interface as one of the interfaces when the network attack indicator is present within the routing information;
   routing network traffic to the destination with the first router in accordance with the forwarding information when the network attack indicator is not present within the routing information; and
   routing network traffic to the discard interface when the network attack indicator is present within the routing information.

15. The method of claim 14, wherein routing network traffic to the destination comprises
   forwarding the traffic to a next hop associated with the route to the destination based on the forwarding information.

16. The method of claim 14, wherein routing network traffic to a discard interface comprises updating the forwarding information to direct the network traffic to the discard interface.

17. The method of claim 16, wherein updating forward information comprises mapping the next hop to the discard interface.

18. The method of claim 14, further comprising calculating traffic flow statistics for the packets routed to the discard interface.

19. The method of claim 14, wherein routing network traffic to a discard interface comprises routing network traffic to a discard interface that is a physical or logical output interface of a router.

20. A network device comprising:
- a set of inbound and outbound interfaces to send and receive packets to and from a computer network, the set of inbound and outbound interfaces including an outbound interface configured as a discard interface to discard the packets received by the discard interface;
- a computer-readable medium storing forwarding information that maps destinations within the network to next hops representing neighboring devices of the network device and to corresponding output interfaces of the network device for reaching the neighboring devices; and
- a control unit to forward the packets between the inbound and outbound interfaces in accordance with the forwarding information, wherein the control unit identifies a target of a network attack, and updates the forwarding information to map the discard interface to the next hop representing the neighboring device along a route to the target.

21. The network device of claim 20, further comprising a filter applied by the control unit to calculate traffic flow statistics for the packets forwarded to the discard interface.

22. The network device of claim 21, further comprising a user interface to receive input from a user prior to a network attack that defines at least one action, wherein the control unit configures the filter prior to the network attack to perform the action specified by the input in response to the network attack and associates the filter with the discard interface.

23. The network device of claim 21, wherein the filter includes one or more counters to calculate traffic flow statistics.

24. The network device of claim 23, wherein the counters calculate one of a number of packets routed to the interface and a number of bytes routed to the interface.

25. The network device of claim 21, wherein the filter logs the packets routed to the interface.

26. The network device of claim 20, wherein the control unit identifies a network destination to which a network attack is targeted, and forwards the portion of the packets destined for the targeted network destination to the discard interface.

27. The network device of claim 20, wherein the control unit generates a communication that advertises a route associated with a network destination that is targeted by a network attack and that includes an attack identifier that indicates the existence of the network attack, and wherein the control unit forwards the communication to other network devices in accordance with a routing protocol.

28. The network device of claim 27, wherein the communication specifies a network prefix associated with the network destination.

29. The network device of claim 27, wherein the communication includes a policy tag to indicate that the advertised route is associated with a network attack.

30. The network device of claim 20, wherein the control unit detects a network attack via a network attack detection algorithm.

31. The network device of claim 20, wherein the control unit receives a communication from a neighboring network device in accordance with a routing protocol, and the communication specifies an advertised route and a policy tag that indicates the route is associated with a network attack.

32. The network device of claim 31, further comprising a user interface to receive input from a user that defines a forwarding policy associated with the policy tag, wherein the forwarding policy specifies that routes learned via the routing protocol and associated with the policy tag are to be mapped to the discard interface.

33. The network device of claim 20, wherein the network attack comprises one of a denial of service attack and a distributed denial of service attack.

34. The network device of claim 20 wherein the control unit receives configuration information from a user to define the interface.

35. The network device of claim 20, wherein the discard interface is a physical or logical output interface.

36. A computer-readable medium comprising instructions that cause a processor to:
- configure an output interface of a router as a discard interface;
- present an interface to receive input from a user that specifies a forwarding policy associated with a policy tag indicative of a network attack;
- receive routing information from a router via a routing protocol, wherein the routing information specifies a network route and the policy tag;
- apply the forwarding policy to update forwarding information of the router in response to the received policy tag to direct packets associated with the specified network route to the discard interface; and
- forward the packets associated with the network route to the output interface configured as a discard interface to drop the packets.

37. The computer-readable medium of claim 36, further comprising instructions to map a next hop associated with the network route to the discard interface when updating the forwarding information.

38. The computer-readable medium of claim 36, further comprising instructions to apply a filter to calculate traffic flow statistics for the packets forwarded to the discard interface.

39. The computer-readable medium of claim 36, further comprising instructions to configure the filter in response to the input.

* * * * *

UNITED STATES PATENT AND TRADEMARK OFFICE
CERTIFICATE OF CORRECTION

PATENT NO.         : 7,525,921 B1                                          Page 1 of 1
APPLICATION NO.    : 10/454271
DATED              : April 28, 2009
INVENTOR(S)        : Jeffrey Yi Dar Lo

It is certified that error appears in the above-identified patent and that said Letters Patent is hereby corrected as shown below:

Column 10, line 51 (Claim 14), "of interface so the" should read -- of interfaces of the --

Column 11, line 5 (Claim 17), "forward" should read -- forwarding --

Signed and Sealed this

Thirtieth Day of November, 2010

David J. Kappos
*Director of the United States Patent and Trademark Office*